March 3, 1959 W. G. ANDERSON ET AL. 2,875,965
AUTOMATIC FLIGHT CONTROL SYSTEM
Filed June 18, 1954 2 Sheets-Sheet 1

INVENTORS
WILLIAM G. ANDERSON
THODORE R. WILLIS
BY *Marvin Moody*
ATTORNEY

INVENTORS
WILLIAM G. ANDERSON
THEODORE R. WILLIS
BY Marvin Moody
ATTORNEY

United States Patent Office 2,875,965
Patented Mar. 3, 1959

2,875,965

AUTOMATIC FLIGHT CONTROL SYSTEM

William G. Anderson and Theodore R. Willis, Cedar Rapids, Iowa, assignors to Collins Radio Company, Cedar Rapids, Iowa, a corporation of Iowa Application June 18, 1954, Serial No. 437,698

9 Claims. (Cl. 244—77)

This invention relates in general to an aircraft control system and in particular to means of controlling aircraft in a vertical plane automatically.

As aircrafts have been developed more and more, it has been desirable to aid the human pilot so that he is released from many of the tedious jobs and can spend his time in preparing to meet unusual conditions that occur during flight.

Various automatic pilots have been developed for automatically flying an aircraft and which relieve the pilot from the controls so that he may spend his time navigating or performing other functions.

The early automatic pilots attempted to control the aircraft in a horizontal plane alone; that is, they were capable of turning or holding an aircraft on a constant heading. Later developments added vertical control so that a craft could simultaneously be controlled in direction and altitude.

Most prior automatic pilots which used vertical control received a command signal from an altimeter which generally has a lag and thus, the control signal was in error by the amount of lag.

To correct for the errors in this control signal it is necessary to incorporate lead networks so that the aircraft may anticipate the lag of the control altimeter. Such fluctuating factors as vertical gusts and horizontal gusts cause errors in aircraft control also.

It is an object of the present invention to provide a method for controlling the flight path of an aircraft in a vertical plane which reduces the aircraft to a point mass.

Dynamically speaking, an aircraft is a mass having six degrees of freedom, three rotational and three translational.

With respect to guidance in the vertical plane, the basic problem is simply to control the vertical position of the aircraft, for example, maintaining constant altitude or following a radio beam such as the glide slope during an automatic approach. Because of the nature of the aircraft, the control problem is difficult. The motions of each of the degrees of freedom in the vertical plane are intercoupled. For example, during the long period or phugoid oscillation, the aircraft's pitch angle, airspeed, and vertical speed all vary at the same frequency because of this intercoupling. Thus the simple problem of controlling the vertical position of the aircraft becomes quite complex.

It is an object of the present invention to minimize the effects of this intercoupling such that the vertical control problem can be approximately reduced to the relatively simple task of positioning an object having one degree of freedom and mass as its only property.

This is achieved by maintaining a constant airspeed at all times and by maintaining a constant angle of attack except when it is desired to accelerate the aircraft in a vertical direction. Vertical guidance information such as vertical speed and altitude is, of course, supplied to the control system such that the aircraft can be made to fly as desired.

Another object of the present invention is to provide an automatic pilot which controls an aircraft in the vertical plane and wherein the air speed is maintained constant irrespectively of the pitch angle of the aircraft.

Another object of the present invention is to maintain the angle of attack constant so that the lift vector does not change in magnitude.

In order to reduce the plane to a point mass it is necessary to maintain the air speed constant regardless of the flight path. The angle of attack of the aircraft must also be kept constant so that the lift vector does not change in magnitude. It is apparent that this system has the characteristics of a point mass unrestrained in the vertical plane. Thus, if these two requirements are met the complex dynamics of the aircraft may be reduced to a situation where any constant force applied to the plane causes a constant acceleration.

A feature of the present invention will be found in the provision for an automatic pilot for controlling an aircraft in the vertical plane and maintaining air speed and the angle of attack constant.

Further features, objects and advantages of the present invention will become apparent from the following description and claims when read in view of the drawings, in which:

Although this invention will be described with respect to vertical control with the elevators and throttle, it is to be realized that it may be used in combination with either the rudder and aileron control portions of a complete automatic pilot to obtain three axis control. Since the novel features of the invention relate to the vertical control only, that portion of the automatic pilot will be described.

As is well known by those skilled in the aircraft art, the angle of attack is the angle between the relative wind and the projection of the chord line of the aircraft's wing. The angle of attack is considered positive when the relative wind appears to be coming from below the wing and is negative when the relative wind appears to be coming from above the wing.

Figure 3:
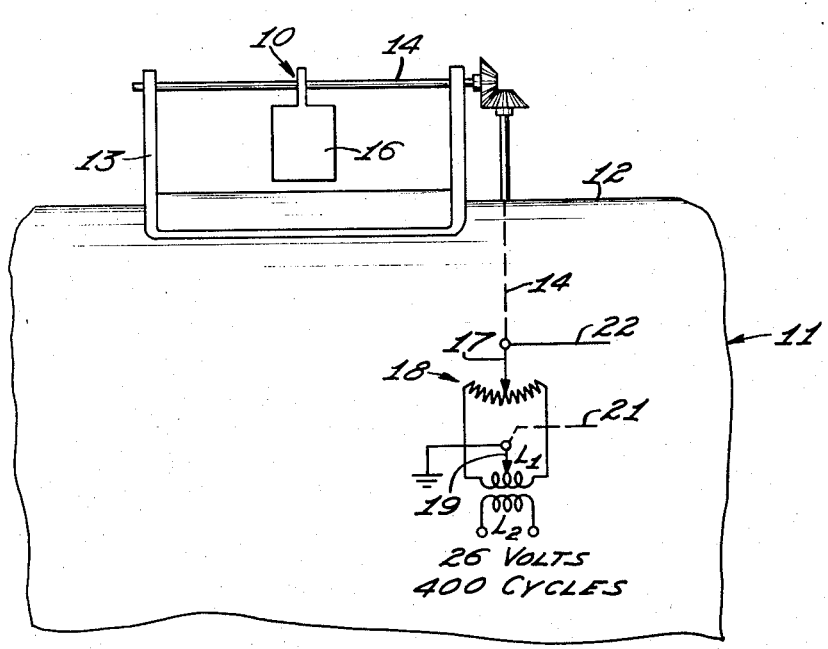
Figure 3 illustrates the angle of attack measuring device.

The angle of attack may be measured by a vane 10 mounted on the wing 11 of the aircraft near the leading edge 12 such as shown in Figure 3.

As seen in Figure 3, a portion of the wing has mounted thereon bracket 13 which pivotally supports a shaft 14 that has a vane blade 16 attached to it. The shaft 14 is mechanically coupled to the slide contact 17 of a variable potentiometer 18. An inductance $L_1$ is connected across the potentiometer 18. A second slide contact 19 is connected to ground and engages the inductance $L_1$. A knob 20 is connected to a shaft 21 which is in turn connected to slide contact 19 to adjust it to a desired angle of attack position.

An exciting voltage which might, for example, be 26 volts, 400 cycles, is supplied to a primary winding $L_2$ which is coupled to winding $L_1$. A lead 22 is connected to the pitch contact 17. A signal proportional to the angle of attack error of the wing is produced by this structure. When the aircraft is in trim, the wiper contact 19 is adjusted so that the signal picked up by the contact 17 will be zero. Then the signal produced at contact 17 will be proportional to error between the desired angle of attack and the actual angle of attack.

Figure 1:
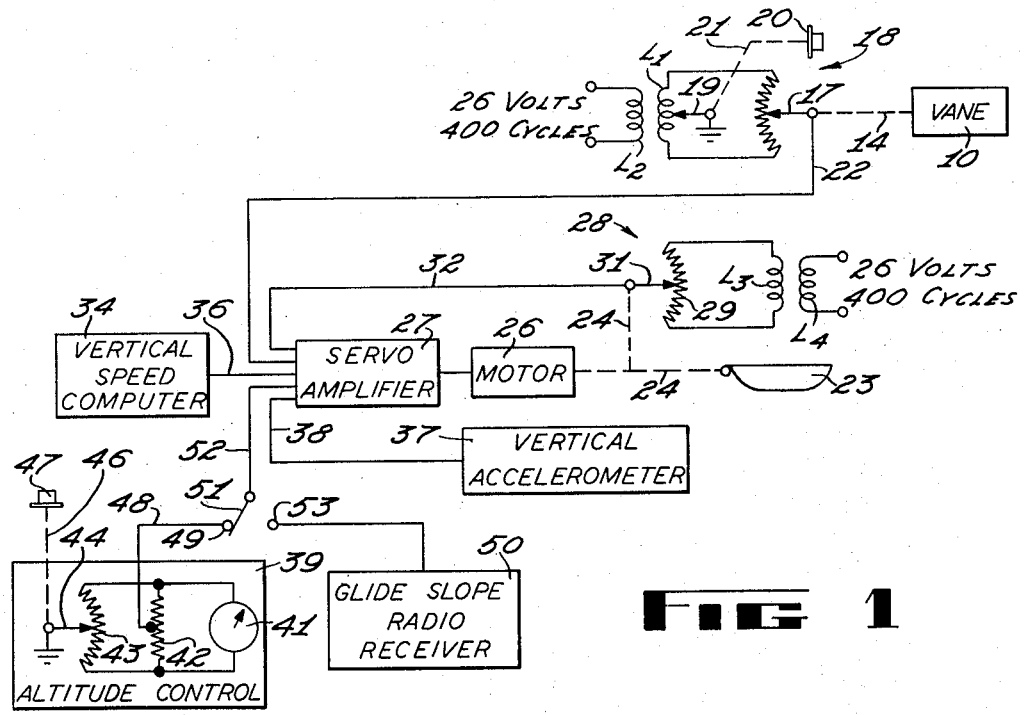
Figure 1 illustrates the elevator control system of this invention.

Referring to Figure 1, an elevator 23 of the aircraft is connected to shaft 24 of an elevator servomotor 26. As is well known to those skilled in the art, variation of the position of the elevator causes the aircraft to pitch up or down.

A servo amplifier 27 is electrically connected to servomotor 26. A variable potentiometer 28 comprises a resistor 29 which has an inductance $L_3$ connected across opposite ends thereof. The mid-point of $L_3$ is grounded and an exciting inductor $L_4$ is coupled to inductance $L_3$ and is connected to a voltage, as for example, 26 volts, 400 cycles. A slide contact 31 engages resistor 29 and is controlled by output shaft 24 of motor 26. A signal proportional to the position of the elevator 23 is produced at contact 31. Contact 31 is connected by lead 32 to the input of servo amplifier 27. This supplies position feed-back to the system. The output contact 17 of the measuring device shown in detail in Figure 3 is connected to the input of the servo amplifier 27 by a lead 22.

A vertical speed computer 34 produces an electrical signal which is proportional to the vertical speed of the aircraft and supplies an input to the servo amplifier 27 through lead 36. Such vertical speed computers are well known to those skilled in the art and will not be described in detail herein.

A vertical accelerometer 37 produces a signal proportional to vertical acceleration which is supplied to the servo amplifier 27 by lead 38. Such vertical accelerometers are well known to those skilled in the art.

A command signal which calls for a constant or varying altitude is produced by an altitude control unit 39. It may have mounted therein an altimeter 41 which produces an electrical signal proportional to altitude. A resistor 42 is connected across the output of the altimeter. A second resistor 43 is connected across the ends of resistor 42. A grounded variable contact 44 is connected to a shaft 46. A knob 47 is attached to shaft 46. The mid-point of resistor 42 is connected by lead 48 to a terminal 49. Thus, knob 47 may be adjusted to call for a particular altitude such as 16,000 feet. If the signal called for is different from the altitude as indicated by the altimeter 41, an error signal proportional to this difference will appear at terminal 49. This output may be connected to servo amplifier 27 by switch 51 and lead 52.

It may be desirable at times to fly a path which varies as a function of time. This function may be used to control knob 47 and the error signal will depend on the variable function.

Since the control per se does not constitute the novelty of the present invention it will be assumed in this application that the control unit 39 merely calls for a constant or different altitude which may be adjusted by the knob 47. However, the invention is not limited to such a control.

A glide slope radio receiver 50 may also be mounted on the aircraft and may be tuned to a glide slope transmitter to produce an electrical output signal proportional to the deviation of the aircraft from the radio defined flight path. The output of receiver 50 is connected to a terminal 53 which may be engaged by switch 51 to supply a signal to amplifier 27.

Figure 2:
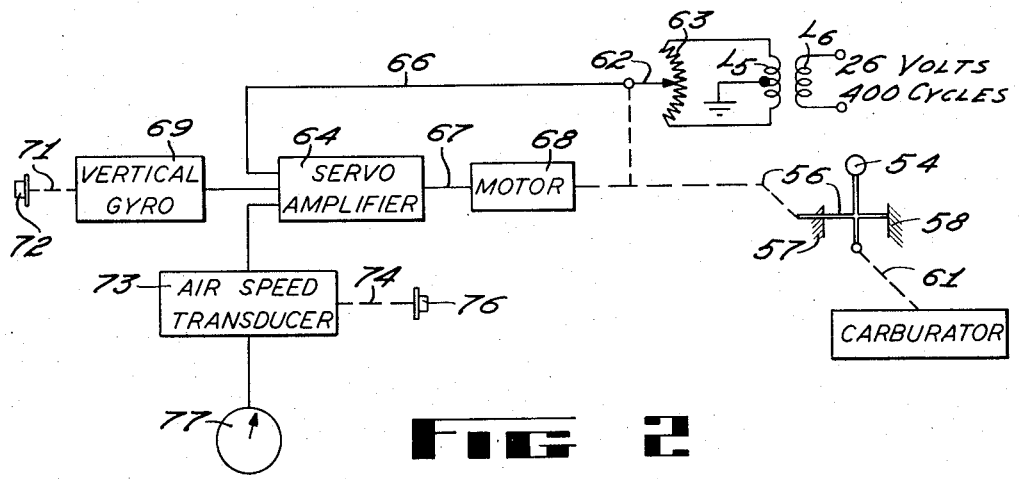
Figure 2 illustrates the throttle control of this invention.

Figure 2 illustrates the throttle control of this invention which maintains the aircraft at a constant air speed. The throttle 54 may be attached to a shaft 56 which is pivotally supported by brackets 57 and 58 that are connected to aircraft. The throttle 54 is linked to the carburetor 59 of the aircraft by linkage 61 to control the power. It is to be realized that this invention may be used with single or multiengine craft and with different types of power plants such as jets, rockets or piston engines.

The shaft 56 is connected to a slide contact 62 that engages a resistor 63. The opposite ends of the resistor 63 are connected to inductor $L_5$ which has its mid-point grounded. An exciting inductor $L_6$ is coupled to $L_5$ and is energized by a suitable voltage as, for example, 26 volts, 400 cycles.

A servo amplifier 64 is connected by the lead 66 to the contact 62 and supplies an input by lead 67 to servomotor 68 which has its output shaft connected to shaft 56 to position the throttle. The contact 62 supplies a position feed-back to the servo system and may be adjusted so that the motor responds linearly to power demands. In other words, it oftentimes happens that the relationship between power and throttle movement is non-linear. For example, when the throttle is half open, it may require a larger adjustment to obtain an increase of ten horsepower than it would when the throttle is nearly closed. This non-linearity may be resolved by constructing resistor 63 so that its resistance changes in a non-linear fashion as contact 62 is moved at a linear rate. The resistor 63 would be wound so as to produce the function of a particular aircraft and power plant. Such procedures are known to those skilled in the art and for a more detailed description, reference may be made to the patent to J. D. Ryder, Number 2,275,317 which issued on March 3, 1942 entitled "Measuring and Controlling Apparatus."

In Figure 2 a vertical gyro 69 has a control shaft 71 with a knob 72 thereon for setting normal trim flight pitch angle. Gyro 69 produces an electrical output proportional to the pitch error which output is connected to the servo amplifier 64 for reducing the pitch error to zero.

An air speed transducer 73 has an input shaft 74 and a control knob 76 for inserting the desired air speed. The transducer 73 is coupled to the air speed indicator 77 and produces an electrical output proportional to the difference between the desired air speed and the actual air speed. The electrical output of transducer 73 is connected to amplifier 64 for reducing the difference to zero.

Thus, the apparatus shown provides means for maintaining the angle of attack and air speed constant even in the presence of gusts.

The relative amplitudes of the signals fed to the servo amplifiers 27 and 64 will be adjusted for the characteristics of the particular aircraft being controlled. That is to say, that the gains of the various feed-backs will vary with different aircrafts and different degrees of stability.

In operation, suppose the aircraft is flying straight and level at a desired altitude of 16,000 feet and at a desired air speed of 300 miles per hour. If the angle of attack error is zero, the output at contact 17 will be zero and there will be no command signal to the elevator servo requiring a correction. Similarly, if the air speed error provided by the air speed transducer 73 is zero, no signal will be supplied to servo amplifier 64 and the throttle will remain stationary. However, if a vertical gust causes the aircraft to change altitude, a signal will immediately appear at the output of the vertical accelerometer 37 and the vertical speed computer 34 and will cause the motor 26 to adjust the elevators to compensate for this disturbing force. When the elevator 23 is changed in position the angle of attack changes and this produces a feed-back from contact 17 to balance with the output of vertical speed computer 34 and accelerometer 37. Thus, the aircraft will anticipate a change in altitude and correct for it by pitching. The pitching will produce an output from the vertical pitch control gyro 69 which drives motor 68 to change the throttle position, and thus, maintain air speed constant. If the air speed does change, however, despite the instantaneous control by the gyro, the air speed transducer signal will again actuate motor 68 to correct the throttle position for the desired air speed.

It is seen that the present invention provides a control system which maintains air speed and angle of attack constant and uses various rate feed-backs so as to stabilize the control of the aircraft.

It is to be realized, of course, that the output of the vertical speed computer 34 produces a signal proportional to the rate of change of altitude which is the first derivative of altitude. Servo theory relating to feedback is well known to those skilled in the art and is described in more detail in the patent to Wirkler, Number 2,548,278 which issued April 10, 1951, entitled "Aircraft Course Stabilizing Means." It is seen that this invention provides a novel automatic control for an aircraft in a vertical plane. The advantages of this system are that the dynamics of the aircraft may be resolved to a much simpler basis.

Although this invention has been described with respect to particular embodiments thereof, it is not to be so limited as changes and modifications may be made therein which are within the full intended scope of the invention, as defined by the appended claims.

We claim:

1. An automatic flight control system for an aircraft comprising, a first motor with its output shaft connected to the elevator of said aircraft, a vertical speed computer mounted on the aircraft and connected to the first motor, a vertical accelerometer connected to said first motor, an altitude control producing an altitude-error signal, the output of said altitude control connected to said first motor, an angle of attack measuring means mounted on said aircraft and producing a signal proportional to the angle of attack, said angle of attack measuring means connected to said first motor, a second motor on said aircraft, a throttle connected to the output shaft of said second motor and controlled thereby, a vertical gyro supplying an electrical output to said second motor, and an air speed transducer supplying an electrical signal to said second motor.

2. Apparatus for controlling an aircraft in the vertical plane comprising, an angle of attack measuring means producing an electrical signal proportional to the deviation from the desired angle of attack, a motor receiving the output of said angle of attack measuring means, the output shaft of said motor connected to the elevators of said aircraft, an elevator follow-up potentiometer mounted on said aircraft and controlled by the output shaft of said motor, the output of said elevator follow-up potentiometer connected to said motor, a vertical speed computer connected to said motor, a vertical accelerometer connected to said motor, and an altitude control producing an altitude error signal proportional to the difference between the desired altitude and the actual altitude connected to said motor.

3. Apparatus for controlling an aircraft in the vertical plane comprising, an angle of attack measuring means producing an electrical signal proportional to the deviation from the desired angle of attack, a motor receiving the output of said angle of attack measuring means, the output shaft of said motor connected to the elevators of said aircraft, an elevator follow-up potentiometer mounted on said aircraft and controlled by the output shaft of said motor, the output of said elevator follow-up potentiometer connected to said motor, a vertical speed computer connected to said motor, and an altitude control producing an altitude error signal proportional to the difference between the desired altitude and the actual altitude connected to said motor.

4. Apparatus for controlling an aircraft in the vertical plane comprising, an angle of attack measuring means producing an electrical signal proportional to the deviation from the desired angle of attack, a motor receiving the output of said angle of attack measuring means, the output shaft of said motor connected to the elevators of said aircraft, an elevator follow-up potentiometer mounted on said aircraft and controlled by the output shaft of said motor, the output of said elevator follow-up potentiometer connected to said motor, a vertical accelerometer connected to said motor, a vertical speed computer connected to said motor, and an altitude control producing an altitude error signal proportional to the difference between the desired altitude and the actual altitude connected to said motor.

5. Apparatus for controlling an aircraft in the vertical plane comprising, an angle of attack measuring means producing an electrical signal proportional to the deviation from the desired angle of attack, a motor receiving the output of said angle of attack measuring means, the output shaft of said motor connected to the elevators of said aircraft, an elevator follow-up potentiometer mounted on said aircraft and controlled by the output shaft of said motor, a vertical speed computer connected to said motor, the output of said elevator follow-up potentiometer connected to said motor, and an altitude control producing an altitude error signal proportional to the difference between the desired altitude and the actual altitude connected to said motor.

6. Apparatus for controlling an aircraft in the vertical plane comprising, an angle of attack measuring means producing an electrical signal proportional to the deviation from the desired angle of attack, a motor receiving the output of said angle of attack measuring means, the output shaft of said motor connected to the elevators of said aircraft, an elevator follow-up potentiometer mounted on said aircraft and controlled by the output shaft of said motor, the output of said elevator follow-up potentiometer connected to said motor, a vertical speed computer connected to said motor, a vertical accelerometer connected to said motor, an altitude control producing an altitude error signal proportional to the difference between the desired altitude and the actual altitude connected to said motor, and an altitude control shaft connected to said altitude control to set in a desired altitude.

7. Apparatus for controlling an aircraft in the vertical plane comprising, an angle of attack measuring means producing an electrical signal proportional to the deviation from the desired angle of attack, an angle of attack shaft connected to the angle of attack measuring means to set in a desired angle of attack, a motor receiving the output of said angle of attack measuring means, the output shaft of said motor connected to the elevators of said aircraft, an elevator follow-up potentiometer mounted on said aircraft and controlled by the output shaft of said motor, the output of said elevator follow-up potentiometer connected to said motor, a vertical speed computer connected to said motor, a vertical accelerometer connected to said motor, and an altitude control producing an altitude error signal proportional to the difference between the desired altitude and the actual altitude connected to said motor.

8. Apparatus for controlling an aircraft in the vertical plane comprising, an angle of attack measuring vane pivotally supported by said aircraft, a wiper contact mechanically connected to said vane, a first resistor in contact with said wiper contact, an exciting voltage impressed across said first resistor, means for varying the virtual ground of the voltage across said first resistor, a desired-pitch knob connected to said means for varying the virtual ground, a servo amplifier electrically connected to said wiper contact, a motor receiving the output of said servo amplifier, an elevator mounted on the output shaft of said motor to control the pitch of said aircraft, an elevator follow-up potentiometer mounted on said aircraft, an electrical signal supplied from said elevator follow-up potentiometer to said servo amplifier, an altimeter producing an electrical signal proportional to the altitude of said aircraft, a second resistor connected across said altimeter, a slide contact connected to ground and engageable with said second resistor, a desired-altitude shaft connected to said slide contact, a third resistor connected in parallel with the second resistor, an electrical conductor connected between the mid-point of said third resistor and said servo amplifier, a vertical speed computer connected to said servo amplifier, and a vertical accelerometer connected to said servo amplifier.

9. Apparatus for controlling an aircraft in the vertical plane comprising, an angle of attack measuring vane pivotally supported by said aircraft, a wiper contact mechanically connected to said vane, a first resistor in contact with said wiper contact, an exciting voltage impressed across said first resistor, means for varying the virtual ground of the voltage across said first resistor, a desired-pitch knob connected to said means for varying the virtual ground, a servo amplifier electrically connected to said wiper contact, a motor receiving the output of said servo amplifier, an elevator mounted on the output shaft of said motor to control the pitch of said aircraft, an elevator follow-up potentiometer mounted on said aircraft, an electrical signal supplied from said elevator follow-up potentiometer to said servo amplifier, an altimeter producing an electrical signal proportional to the altitude of said aircraft, a second resistor connected across said altimeter, a slide connected to ground and engageable with said second resistor, a desired-altitude shaft connected to said slide contact, a third resistor connected in parallel with the second resistor, an electrical conductor connected between the mid-point of said third resistor and said servo amplifier, a vertical speed computer connected to said servo amplifier, a vertical accelerometer connected to said servo amplifier, a second motor, a throttle connected to the output shaft of the second motor, a second servo amplifier connected to said second motor, a throttle feed-back potentiometer connected to the output shaft of said second motor and supplying an input to said second servo amplifier, a vertical gyro producing an output proportional to the desired pitch supplying an input to said second servo amplifier, and an air speed transducer producing an electrical signal proportional to the air speed error connected to said second servo amplifier.

References Cited in the file of this patent

UNITED STATES PATENTS

| | | |
|---|---|---|
| 2,507,304 | Hofstadter | May 9, 1950 |
| 2,627,384 | Esval | Feb. 3, 1953 |
| 2,630,987 | Hauptman | Mar. 10, 1953 |
| 2,672,334 | Chenery | Mar. 16, 1954 |
| 2,677,513 | Kliever | May 4, 1954 |
| 2,701,111 | Schuck | Feb. 1, 1955 |